United States Patent
Nagata et al.

(10) Patent No.: US 6,587,420 B1
(45) Date of Patent: Jul. 1, 2003

(54) RECORDING AND REPRODUCING METHOD FOR OPTICAL INFORMATION RECORDING MEDIUM AND OPTICAL INFORMATION RECORDING MEDIUM

(75) Inventors: Ken'ichi Nagata, Nishinomiya (JP); Noboru Yamada, Hirakata (JP); Nobuo Akahira, Yawata (JP); Kenichi Nishiuchi, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/319,325

(22) PCT Filed: Mar. 23, 1998

(86) PCT No.: PCT/JP98/01285

§ 371 (c)(1),
(2), (4) Date: Jun. 3, 1999

(87) PCT Pub. No.: WO98/44493

PCT Pub. Date: Oct. 8, 1998

(30) Foreign Application Priority Data

Mar. 27, 1997 (JP) .............................. 9-075409
Sep. 25, 1997 (JP) .............................. 9-259876

(51) Int. Cl.⁷ ................................. G11B 7/00
(52) U.S. Cl. ................. 369/100; 369/13.35; 369/44.26; 369/275.4
(58) Field of Search ....................... 369/44.26, 100, 369/275.2, 275.4, 44.31, 44.27, 53.2, 53.22, 53.23, 44.41, 275.1, 13.41, 13.38, 13.55, 13.54

(56) References Cited

U.S. PATENT DOCUMENTS 4,606,018 A * 8/1986 Sugiki et al. .......... 369/109.01
5,089,358 A * 2/1992 Taki et al. ............... 369/275.1
5,136,567 A   8/1992 Nagahara et al.
5,249,175 A   9/1993 Akahira et al.
5,410,534 A   4/1995 Nagata et al.
5,581,539 A * 12/1996 Horie et al. ............. 369/275.1
5,646,930 A *  7/1997 Furumiya .................. 369/116
5,936,920 A *  8/1999 Noda ...................... 369/44.41
6,021,109 A *  2/2000 Spruit et al. ................ 369/100
6,222,803 B1 *  4/2001 Uemura et al. .......... 369/44.29

FOREIGN PATENT DOCUMENTS

| EP | 0 626 679 | 11/1994 |
|---|---|---|
| EP | 0 737 967 | 10/1996 |
| JP | 61-239427 | 10/1986 |
| JP | 62-259236 | 11/1987 |
| JP | 3-157830 | 7/1991 |
| JP | 8-83426 | 3/1996 |
| JP | 8-315425 | 11/1996 |
| WO | WO 98/24089 | 6/1998 |

OTHER PUBLICATIONS

Schouhamer Immink, The Digital Versatile Disc (DVD): System Requirements and Channel Coding; SMPTE Journal, vol. 105, No. 8, pp. 483–489, Aug. 1, 1996.

(List continued on next page.)

Primary Examiner—Thang V. Tran
(74) Attorney, Agent, or Firm—Merchant & Gould, P.C.

(57) ABSTRACT

Tracking control is carried out by a push-pull method or by mechanical feed at the time of recording signals, and tracking control is carried out by a phase difference tracking method at the time of reproduction. Thus, a phase change type optical disk which enables phase difference reproduction and is erasable may be realized. In a phase change type optical disk having a phase difference reproduction structure, servo mechanism at the time of reproducing signals may be stably controlled by causing the reflectance of a blank portion to be higher than the reflectance of a recording mark portion.

12 Claims, 7 Drawing Sheets

OTHER PUBLICATIONS

Nakamura et al. "Fine Focus 1–Beam Optical Pickup System" *National Technical Report*, vol. 32, No. 4, pp. 72–80 (with English translation of pp. 76–77), Aug. 1986.

Ogami et al. *Optical Disk Technology*, publ. by Radio Technology Corp., pp. 86–97 (with English translation of pp. 86–87), Feb. 1989.

* cited by examiner

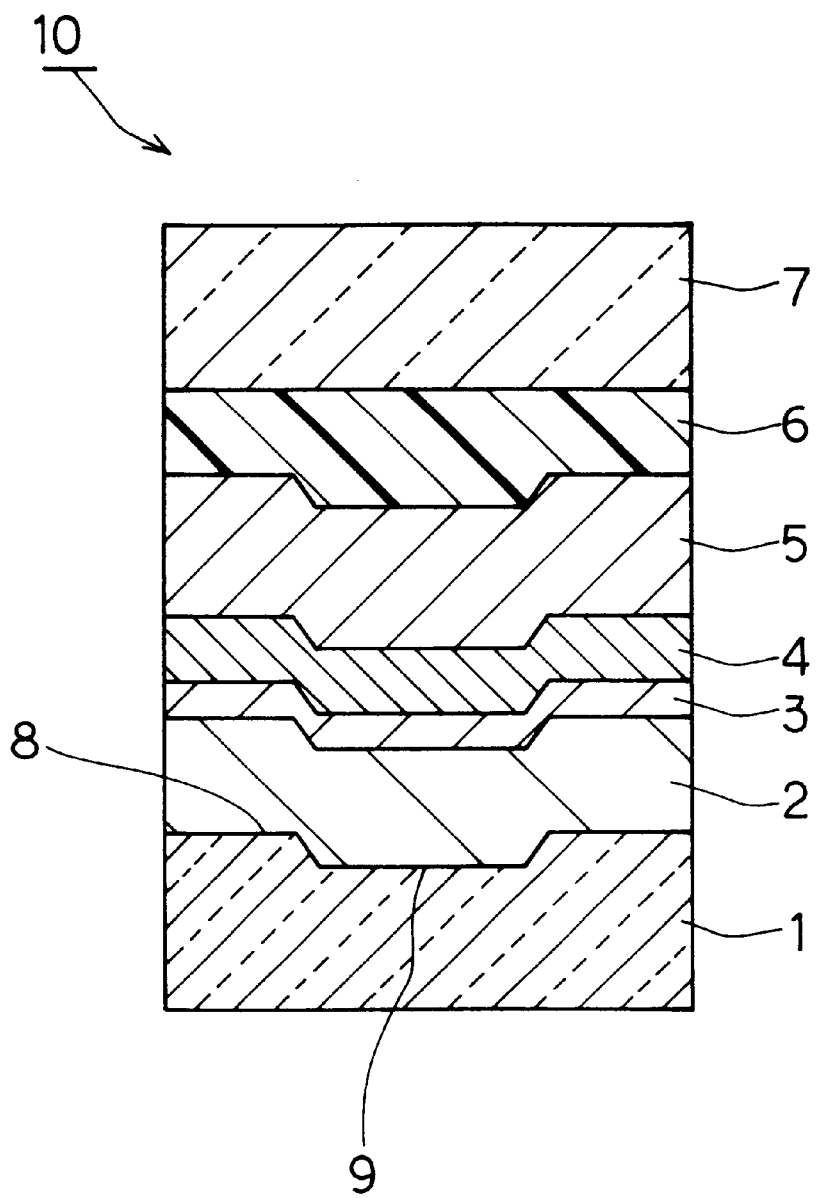
F I G. 1

RECORDING AND REPRODUCING METHOD FOR OPTICAL INFORMATION RECORDING MEDIUM AND OPTICAL INFORMATION RECORDING MEDIUM

TECHNICAL FIELD

The present invention relates to a method for recording signals at high recording density and reproducing the recorded signals using laser beam, and an optical information recording medium used in the method.

BACKGROUND ART

Examples of a so-called read-only optical information recording medium for reproduction of signals using laser beams include optical disks referred to as a compact disk (CD), a laserdisk (LD) and a digital video disk (DVD).

Currently, DVDs can record signals at a higher density than any other read-only optical information recording media that are commercially available at present.

The read-only DVD is an optical disk having a diameter of 120 mm and a maximum user capacity of 4.7 GB per layer for recording. The substrate commonly is formed of a disk-shaped polycarbonate having a thickness of 0.6 mm and a diameter of 120 mm.

Information signals are reproduced by irradiation of laser beams with a wavelength of 650 nm or 635 nm (practically in a range of 630 nm to 670 nm because of errors). A tracking servo mechanism that maintains a reproduction laser beam at the center of a recorded single track utilizes phase difference tracking error signals for reproduction of a DVD (e.g., National Technical Report Vol. 32 No. 4, August, 1986, pp.72–80) (Version 1 of DVD-ROM specification).

Examples of an optical information recording medium capable of recording and reproducing signals using laser beam include a phase change type optical disk, a magneto-optical disk, an optical disk using a dye material or the like. Among them, in a recordable phase change type optical disk, a chalcogenide typically is used as a recording thin film material. Generally, the crystalline state of the recording thin film material is used as a non-recorded state. Signals are recorded by irradiating the recording thin film material with laser beam so as to melt and quench the recording thin film material so that the material becomes amorphous. On the other hand, in order to erase signals, the recording thin film is irradiated with laser beams at a power lower than that for recording so that the recording thin film becomes crystalline.

Furthermore, for the purpose of improving the recording density of a phase change optical disk, it has been proposed to determine the disk structure so that a phase difference between light reflected from the non-recorded portion and light reflected from the recorded portion is caused with respect to a wavelength λ of the reproduction laser beam (e.g., Japanese Patent Publication Nos. 2773945 and 2661293, and Japanese Laid-Open Patent Publication (Tokkai-Hei) No. 6-4900). Compared with a general reflectance-difference reproducing structure, the phase difference reproducing structure provides better quality signals for reproduction even if the signals are recorded at high density.

Typically, a substrate having spiral or concentric circular grooves referred to as guide grooves is used to obtain tracking error signals for recording and reproducing signals on a recordable optical disk. More specifically, the tracking error signals can be obtained by, for example, a push-pull method or a 3-beam method by irradiation of the laser beam for recording and reproduction. Alternatively, a substrate with a staggered arrangement of pits referred to as wobble pits is used for a tracking servo mechanism by a track wobbling method (e.g., "Optical Disk Technology" edited by Morio Ogami, published by Radio Technology Corp, pp86–97).

As described above, read-only DVDs can store signals a higher density than any other commercially available optical information recording media. However, users cannot record arbitrary information in the read-only DVDs.

DISCLOSURE OF INVENTION

An object of the present invention: is to provide a recordable optical information recording medium that can be reproduced by a reproducing device for read-only DVDs and has stable focus servo characteristics.

The characteristics required for a recordable optical information recording medium that can be reproduced, by a reproducing device for read-only DVDs are as follows:

1. To record signals at a physical recording density equal to that of the read-only DVD (bit length: 0.267 μm/bit; track pitch: 0.74 cm; and modulation system of signals: 8/16, RLL (2,10)).
2. To obtain phase difference tracking error signals from the optical information recording medium in which signals are recorded.
3. To have a reflectance equal to that of the read-only DVD.

However, regarding item 3 of the reflectance, a recording medium with a lower reflectance can be used by introducing minor changes such as raising the reproduction gain of the reproducing device for DVDs, lowering circuit noise, or raising the output of reproduction laser beam.

Another object of the present invention is to provide a method for recording signals at a physical density equal to that of the read-only DVD on the optical information recording medium having the above-described characteristics and reproducing the recorded signals.

The present invention has the following features to achieve the above- described objects.

A first feature of a method for recording and reproducing information on an optical information recording medium of the present invention includes the steps of irradiating an optical information recording medium with laser beam based on an information signal, the optical information recording medium including at least a recording thin film that effects a phase change between an amorphous state and a crystalline state by the irradiation of the laser beam, the recording thin film formed on a disk-shaped substrate including guide grooves; thereby recording a desired signal by forming a record mark on the recording thin film while applying a tracking servo mechanism with a tracking error signal obtained from the guide groove of the substrate; and irradiating the optical information recording medium where the record mark is formed on the recording thin film with laser beam; thereby reproducing a signal while applying a tracking servo mechanism based on a tracking error signal obtained from the record mark.

A second feature of a method for recording and reproducing information on an optical information recording medium of the present invention includes the steps of irradiating an optical information recording medium with laser beam based on an information signal while rotating a substrate and moving a laser beam irradiation portion so that an interval between recorded signals in a radial direction is constant, the optical information recording medium including at least a recording thin film that effects a phase change between an amorphous state and a crystalline state by the irradiation of the laser beam, the recording thin film formed on a disk-shaped substrate including a specular recording region. This effects the phase change to form a record mark on the recording thin film so that desired record signals are recorded at a constant interval in the radial direction; the optical information recording medium where the record mark is formed on the recording thin film is irradiated with laser beams; thereby reproducing a signal while applying a tracking servo mechanism based on a tracking error signal obtained from the record mark.

The method for recording and reproducing information on an optical information recording medium of the present invention with the above-described features allows recording and reproduction of signals at a physical density equal to that of a read-only DVD.

A first feature of an optical information recording medium of the present invention includes at least a recording thin film that effects a phase change between an amorphous state and a crystalline state by irradiation of laser beams. The recording thin film is formed on a disk-shaped substrate including guide grooves having a groove depth d (nm). The groove depth d, a wavelength $\lambda_1$ (nm) of a laser beam for forming a record mark on the recording thin film based on an information signal and a refractive index $n_1$ of the substrate at the wavelength $\lambda_1$ satisfy the relationship:

$$0.05 \times \lambda_1/n_1 \leq d;$$

the groove depth d (nm), a wavelength $\lambda_2$ (nm) of a laser beam for reproducing the record mark formed on the recording thin film and a refractive index $n_2$ of the substrate at the wavelength $\lambda_2$ satisfy the relationship:

$$d \leq 0.09 \times \lambda_2/n_2;$$

a phase $\phi_1$ of light reflected from the record mark and a phase $\phi_2$ of light reflected from a non-record mark region with respect to a laser beam at the wavelength $\lambda_2$ satisfy the relationship:

$$(2n+0.7) \times \pi < \phi_2 - \phi_1 < (2n+1.3) \times \pi,$$

where n is an integer; and an amplitude intensity $I_1$ of light reflected from the record mark in the optical information recording medium and an amplitude intensity $I_2$ of light reflected from the non-record mark region with respect to an incident laser beam at the wavelength $\lambda_2$ (nm) satisfy the relationship:

$$I_1 < I_2.$$

A second feature of an optical information recording medium of the present invention includes at least a recording thin film that effects a phase change between an amorphous state and a crystalline state by the irradiation of the laser beam. The recording thin film is formed on a disk-shaped substrate. A phase $\phi_1$ of light reflected from a record mark in the optical information recording medium and a phase $\phi_2$ of light reflected from a non-record mark region with respect to a wavelength $\lambda_2$ of the laser beam for reproducing a signal recorded on the optical information recording medium satisfy the relationship:

$$(2n+0.7) \times \pi < \phi_2 - \phi_1 < (2n+1.3) \times \pi,$$

where n is an integer.

An amplitude intensity $I_1$ of light reflected from the record mark in the optical information recording medium and an amplitude intensity $I_2$ of light reflected from the non-record mark region with respect to incident laser beam at the wavelength $\lambda_2$ (nm) satisfy the relationship:

$$I_1 < I_2.$$

The optical information recording medium of the present invention with the above-described features allows recording of signals at a density equal to that of a read-only DVD and reproduction with a reproducing device for a read-only DVD and has stable focus servo characteristics.

In the above embodiment, the main elements constituting the recording thin film preferably include Ge and Te, and a ratio of Ge to Te (Ge: Te) in atomic weight is in the range from 45:55 to 55:45.

BRIEF DESCRIPTION OF DRAWINGS

FIG. 1 is a cross-sectional view in the radial direction schematically showing a multilayer structure of an optical information recording medium according to a first embodiment of the present invention.

BEST MODE FOR CARRYING OUT THE INVENTION

Figure 2:
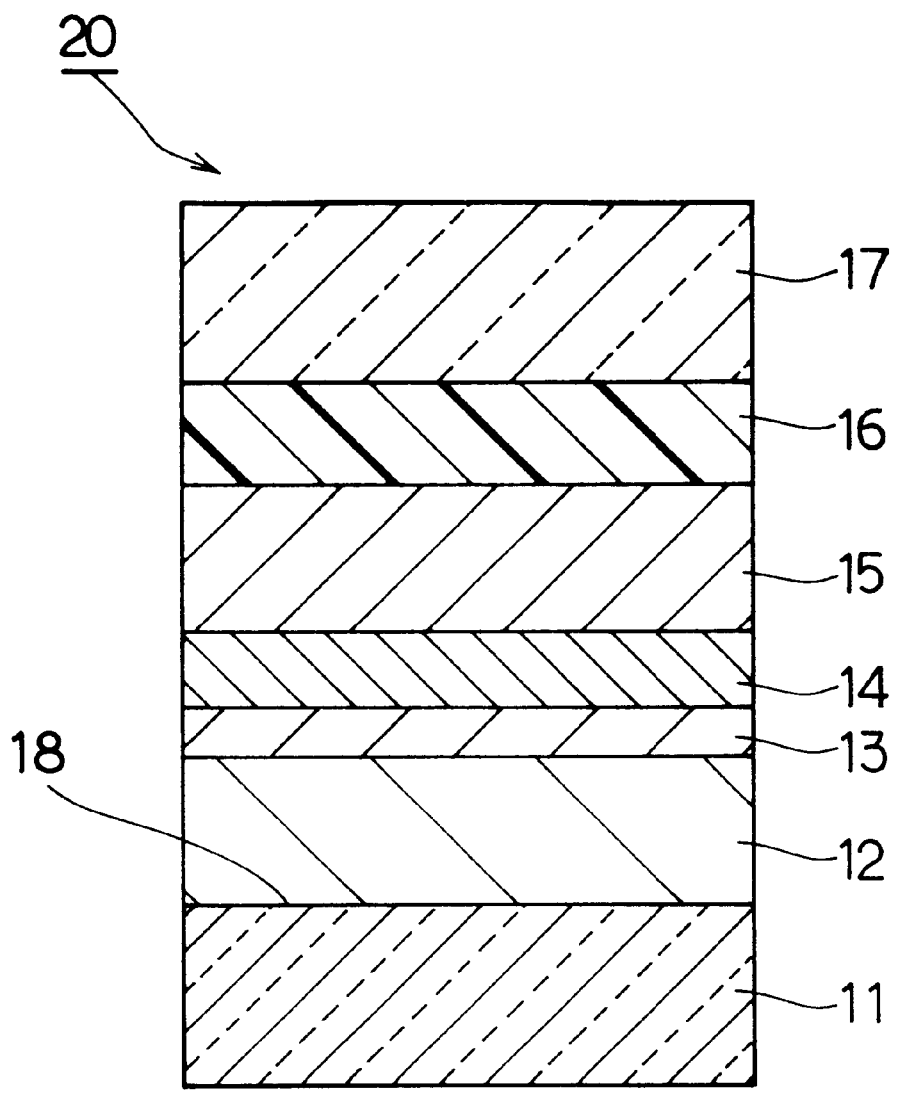
FIG. 2 is a cross-sectional view in the radial direction schematically showing a multilayer structure of an optical information recording medium according to a second embodiment of the present invention.

Hereinafter, preferable embodiments will be described with reference to the accompanying drawings.

Embodiment 1

FIG. 1 is a cross-sectional view in the radial direction schematically showing a multilayer structure of an optical information recording medium (optical disk) 10 according to Embodiment 1 of the present invention. In FIG. 1, laser beams for recording and reproduction are incident from the side of a substrate 1.

The substrate 1 is formed of a resin such as polycarbonate and PMMA, glass or the like, and a surface 8 of the substrate is covered with spiral or concentric continuous grooves (guide grooves or tracks) 9.

It is desirable that the material for protective layers 2 and 4 is stable physically and chemically, namely, has a higher melting point and softening temperature than the melting point of a material for a recording thin film that will be described later, and that the material for the protective layers 2 and 4 does not form a solid solution with the material for a recording thin film. For example, the protective layers 2 and 4 are preferably formed of a dielectric such as $Al_2O_3$, $SiO_x$, $Ta_2O_5$, $MoO_3$, $WO_3$, $ZrO_2$, ZnS, $AlN_x$, BN, $SiN_x$, TiN, ZrN, $PbF_2$, and $MgF_2$, or a suitable combination of these dielectrics. However, the protective layers 2 and 4 are not necessarily transparent, and they may be formed of ZnTe or the like, which has an optical absorptivity with respect to visible light and infrared rays. Furthermore, when the protective layers 2 and 4 are formed of different materials, there is an advantage in that the degree of freedom for thermal and optical design increases. The protective layers 2 and 4 can be formed of the same material.

A recording thin film 3 can be formed of a material that changes reversibly between a crystalline state and.:an amorphous state by irradiation of laser beam for recording. Examples of such a material include a phase change material comprising Te, In, Se or the like as a main component. Te—Sb—Ge, Te—Ge, Te—Ge—Sn, Te—Ge—Sn—Au, Sb—Se, Sb—Te, Sb—Se—Te, In—Te, In—Se, In—Se—Ti, In—Sb, In—Sb—Se, In—Se—Te are known as main components of a phase change material. These thin films generally are formed to have an amorphous state, but the absorption of energy such as laser beam makes the films crystalline so that the optical constants (refractive index n and extinction coefficient k) change.

A reflective layer 5 is formed of a metal element such as Au, Al, Ni, Fe, Cr or the like, or an alloy of these metals, and serves to raise the efficiency of the light absorption of the recording thin film.

A protective substrate 7 may be a spin-coated resin, the same resin sheet as the substrate 1, a glass sheet or a metal sheet that is attached with an adhesive 6. Furthermore, two recording media can be attached with an intermediate substrate interposed therebetween or the reflective layers facing each other with an adhesive so that recording, reproduction and erasing can be performed on both sides.

Each layer of the recording thin film, the protective layer, the reflective layer or the like typically is formed by electron-beam evaporation, sputtering, ion plating, CVD, laser sputtering or the like.

Suitable selection of the thicknesses of the protective layers 2 and 4 and the recording thin film 3 allows a phase difference between light reflected from a non-recorded region (generally crystalline state) and light reflected from a record mark region (generally amorphous state) with respect to the wavelength of laser beam for reproduction of the optical information recording medium to be $(2n+1)\times\pi$, where n is an integer, or in the vicinity of $(2n+1)\times\pi$ (e.g., Japanese Patent Publication No. 2068311 and Japanese Laid-Open Patent Publication (Tokkai-Hei) No. 6-4900). This type of a so-called phase change optical disk with a phase difference reproduction structure is more suitable to reproduce signals recorded in high density than a general reflectance difference reproduction type phase change optical disk. Furthermore, since recorded information signals can be reproduced by utilizing the phase difference, phase difference tracking error signals can be detected. In other words, it is possible in theory to apply a phase difference servo tracking mechanism.

When effects of guide grooves need not be considered because there is no guide groove or the depth of the guide grooves is small, the most desirable phase difference for phase difference reproduction is $(2n+1)\times\pi$, where n is an integer. In practice, when the wavelength of the laser beam used is $\lambda_2$ and a groove depth d is in the range: $d \leq 0.09 \times \lambda_2/n_2$, a reproduction signal amplitude of not less than 60% of the ideal level and good phase difference tracking error signals can be obtained, as long as the following relationships are satisfied:

$$(2n+0.7)\times\pi < \phi_2 - \phi_1 < (2n+1.3)\times\pi,$$

where n is an integer: and $$I_2/I_1 < 3, \text{ more preferably, } I_2/I_1 < 2,$$

where $\phi_1$ represents a phase of light reflected from the amorphous region of the recording thin film, $\phi_2$ represents a phase of light reflected from the crystalline region of the recording thin film, $I_1$ represents an amplitude intensity of light reflected from the amorphous region of the recording thin film, and $I_2$ represents an amplitude intensity of light reflected from the crystalline region of the recording thin film.

When the groove depth d of the guide groove substantially satisfies $d=0.07\times\lambda_2/n_2$, an ideal phase difference for recording information on the groove is:

$$\phi_2 - \phi_1 = (2n-0.9)\times\pi,$$

where n is an integer, and an ideal phase difference for recording between the grooves is:

$$\phi_2 \phi_1 = (2n+0.9)\times\pi,$$

where n is an integer.

The reason why the smaller ratio of the amplitude intensity $I_2/I_1$ is better is described in Japanese Laid-Open Patent Publication No. 6-4900 in detail.

However, in practice, in an attempt of achieving a phase difference reproduction structure in a phase change optical disk, it is difficult to obtain a structure with a high reflectance especially with respect to a wavelength of 650 nm for reproduction light (wavelength for reproduction light specified by the DVD specification). As described later, the highest reflectance of a phase difference reproduction medium that can he achieved with a currently known chalcogen material is no more than the 10% range. In this case, unless reproduction is performed with an ideal reproduction drive (i.e., a drive with sufficiently low circuit noise and reproduction light noise), the focus servo mechanism becomes unstable or circuit noise overlaps reproduction signals, so that reproduction jitter values are degraded. As a result, inherent characteristics of the optical disk cannot be presented. Therefore, when such an ideal reproduction drive is not used for reproduction (for example, a reproduction drive having worse servo characteristics than ideal levels, a reproduction drive having higher circuit noise than ideal levels or an inexpensive reproduction drive is used), good reproduction characteristics can be obtained by designing the optical characteristics of the optical disk with an emphasis on a high average reflection even at the expense of other characteristics. In order to raise an average reflection, the reflectance in regions other than the record marks may be raised. In this case, the reflectance in the record marks becomes low as a natural consequence. In other words, in the design of a phase difference reproduction structure, a larger ratio of the amplitude intensities $I_2/I_1$ with respect to the wavelength of the reproduction light results in a larger acceptability of the reproduction drive to the servo characteristics. In order to have evidently better servo characteristics during reproduction than in the case where $I_1=I_2$, at least the ratio of the amplitude intensities $I_2/I_1$ was required to be larger than 1.3.

Even in the phase change optical disk with a phase difference reproduction structure, phase difference tracking error signals cannot be obtained in a non-recorded state. Therefore, for recording in a non-recorded region of an optical disk, a push-pull tracking method is adopted with guide grooves.

When recording is performed with the tracking servo mechanism by the push-pull tracking method, the largest tracking error signal can be obtained when the relationship between the groove depth d (nm) of the guide groove and the wavelength $\lambda_1$ (nm) of laser beam for recording is $d=0.125 \times \lambda_1/n_1$, where $n_1$ is an refractive index of the substrate (e.g., "Optical Disk Technology" edited by Morio Ogami, published by Radio Technology Corp., p.87). Thus, a value in the vicinity of $0.125 \times \lambda_1/n_1$ is selected as the groove depth d for a general phase change optical disk.

However, when the tracking servo mechanism is applied by the push-pull method using the guide grooves for recording and the tracking servo mechanism is applied using phase difference tracking error signals obtained from recorded signals for reproduction, the groove depth d of the guide groove is required to be examined from another point of view.

For example, when the groove depth of the guide groove is $0.125 \times \lambda_2/n_2$, (where $\lambda_2$ is a wavelength of laser beam for reproduction, and $n_2$ is the refractive index of the substrate corresponding to the wavelength $\lambda_2$, which apply to those described later), troubles occur during reproduction. The reason is as follows: In the case of the phase difference reproduction, the smaller the depth of the guide groove is, the higher the quality of reproduction signals is. On the other hand, the reproduction signal is smallest when the depth d is in the vicinity of $0.125 \times \lambda_2/n_2$ in principle.

Therefore, the relationship between the groove depth in the push-pull method and the amplitude of the tracking error signal was examined. As a result, in the case where parameters other than the groove depth were the same, when the groove depth was $0.05 \times \lambda_1/n_1$, the amplitude of the tracking error signal was about 50% of the amplitude of a signal in an ideal state (the groove depth is about $0.125 \times \lambda_1/n_1$), which was found to be the lowest limit necessary to apply the tracking servo mechanism. In other words, in view of the traching servo for recording, the groove depth is preferably $0.05 \times \lambda_1/n_1$ or more.

Next, the relationships between the groove depth and the amplitude of the reproduction signal and the amplitude of the phase difference tracking error signal for phase difference reproduction of an optical disk where signals were recorded were examined. As a result, in the case where parameters other than the groove depth were the same, when the groove depth was more than $0.09 \times \lambda_2/n_2$, the qualities of the reproduction signal and the tracking error signal were degraded so significantly that it is difficult to put the medium to practical use. Therefore, in view of the tracking servo characteristics during reproduction, the groove depth is preferably $0.09 \times \lambda_2/n_2$ or less.

When the relationship of $\lambda_1$ and $\lambda_2$ is $\lambda_1 < \lambda_2$, the range of the groove depth that satisfies the above-described relative equation is widened. In addition, for recording signals in high density, also in view of widening the power tolerance of recording, it is more desirable to have the wavelength of laser beam for recording be shorter than the wavelength of laser beam for reproduction than the case of vice versa. Therefore, a preferable relationship of $\lambda_1$ and $\lambda_2$ is $\lambda_1 \leq \lambda_2$.

The relationship between a phase $\phi_1$ of light reflected from record marks and a phase $\phi_2$ of light reflected from non-record mark regions between the record marks with respect to incident laser beam for reproduction uniquely determines whether to record signals on the grooves or between the grooves. In other words, when $$(2n+0.5)\times\pi < \phi_2-\phi_1 < (2n+1)\times\pi$$

(where n is an integer), signals are recorded between the grooves in the substrate. When $$(2n+0.5)\times\pi < \phi_2-\phi_1 < (2n+1.5)\times\pi$$

(where n is an integer), signals are recorded on the grooves in the substrate. If this selection is the other way around, the obtained amplitude of the reproduction signals becomes smaller than in the case of the right selection. This is caused by the effect of the phase difference resulting from the presence of the guide grooves.

The first embodiment that has been described so far assumes that the record marks correspond to the amorphous regions in the recording thin film, and the non-recorded portions (also referred to as non-record marks) corresponds to the crystalline regions. However, the record marks may be crystalline regions in the recording thin film, and the non-recorded portions (non-record marks) may be amorphous regions. In this case, it is not necessary to initialize the optical disk (crystallize the entire recording region).

Furthermore, a recording device and a reproducing device are preferably integrated to form one apparatus, especially in such a manner that a mechanism for rotating a disk is used for recording and reproduction. However, the recording device and the reproducing device can be used separately. For example, it is practical to use a commercially available DVD reproducing apparatus or a slightly modified commercially available DVD reproducing apparatus (for example, the reproduction gain is raised, or the intensity of reproduction light is raised so that the reproducing apparatus can be used with an optical information medium having a low reflectance) as the reproducing device.

Tracking during recording is not limited to the push-pull method, and other systems using tracking error signals obtained from the guide grooves, for example, a 3-beam method, can be used to obtain the same advantages. One application of the present invention can be as an authoring tool of a DVD.

Embodiment 2

Next, a second embodiment of the present invention will be described.

FIG. 2 is a cross-sectional view in the radial direction showing a schematic laminated structure of an optical information recording medium (optical disk) 20 according to the second embodiment of the present invention. The fundamental difference from the optical disk of FIG. 1 lies in that a substrate surface 18 as a recording region in a substrate 11 is optically specular and no guide grooves are formed thereon. Other aspects (e.g., phase difference reproduction structure or the like) are the same as those of FIG. 1. More specifically, the substrate 11, a protective layer 12, a recording thin film 13, a protective layer 14, a reflective layer 15, an adhesive 16, a protective substrate 17 correspond to the substrate 1, the protective layer 2, the recording thin film 3, the protective layer 4, the reflective layer 5, the adhesive 6, and the protective substrate 7 in the first embodiment, respectively. These components will not be described in detail.

In this embodiment, the substrate includes no guide groove. Therefore, the most satisfactory phase difference signals for reproduction can be obtained when the relationship between a phase $\phi_1$ of light reflected from the recording thin film region in an amorphous state and a phase $\phi_2$ of light reflected from the recording thin film region in a crystalline state is:

$$\phi_2-\phi_1=(2n\pm1)\times\pi,$$

where n is an integer.

In practice, as long as the following relationships are satisfied, a reproduction signal amplitude of not less than 60% of the ideal levels and satisfactory phase difference tracking error signals can be obtained:

$$(2n+0.7)\times\pi<\phi_2-\phi_1<(2n+1.3)\times\pi,$$

(n is an integer), where $\phi_1$ is a phase of light reflected from the recording thin film region in the amorphous state, and $\phi_2$ is a phase of light reflected from the recording thin film region in the crystalline state, with respect to incident laser beams at a wavelength $\lambda_2$, and $$I_2/I_1<3,$$

where $I_1$ is an amplitude intensity of light reflected from the recording thin film region in the amorphous state, and $I_2$ is an amplitude intensity of light reflected from the recording thin film region in the crystalline state. The reason why a larger ratio of the amplitude intensities $I_1/I_2$ is preferable is described in Japanese Laid-Open Patent Publication No. 6-4900, which has been referred to earlier.

However, in practice, in an attempt to achieve a phase difference reproduction structure in a phase change optical disk, it is difficult to obtain a structure with a high reflectance, especially with respect to a wavelength for 650 nm for reproduction light (the wavelength for reproduction light specified by the DVD specification). As described later, the highest reflectance of a phase difference reproduction medium that can be achieved with a currently known chalcogen material is no more than,,the 10% range. In this case, unless reproduction is performed with an ideal reproduction drive (i.e., a drive with sufficiently low circuit noise and reproduction light noise), the focus servo mechanism becomes unstable or circuit noise overlaps reproduction signals, so that reproduction jitter values are degraded. As a result, inherent characteristics of the optical disk cannot be presented. Therefore, when such an ideal reproduction drive is not used for reproduction (for example, a reproduction drive having worse servo characteristics than ideal levels, a reproduction drive having higher circuit noise than ideal levels or an inexpensive reproduction drive is used), good reproduction characteristics can be obtained by designing the optical characteristics of the optical disk with an emphasis on a high average reflection even at the expense of other characteristics. In order to raise an average reflection, the reflectance in regions other than the record marks may be raised. In this case, the reflectance in the record marks becomes low as a natural consequence. In other words, in the design of a phase difference reproduction structure, a larger ratio of the amplitude intensities $I_2/I_1$ with respect to the wavelength of the reproduction light results in a larger acceptability of the reproduction drive to the servo characteristics. In order to have evidently better servo characteristics during reproduction than in the case where $I_1=I_2$, at least the ratio of the amplitude intensities $I_2/I_1$ was required to be larger than 1.3.

Figure 3:
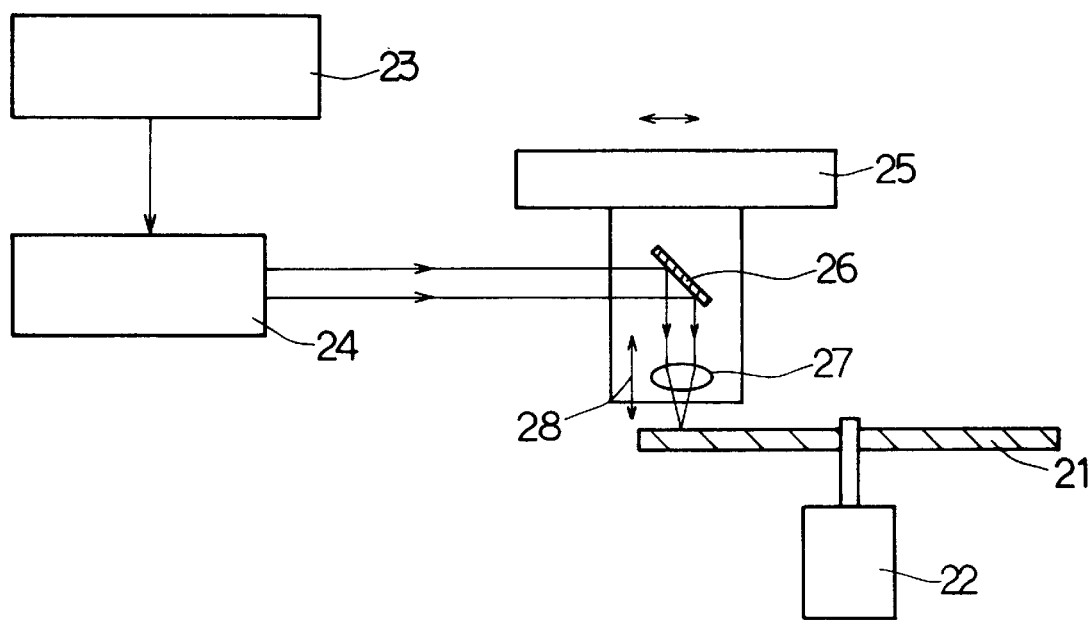
FIG. 3 is a schematic drawing showing a structural example of a recording device used for recording signals on the optical information recording medium of the present invention.

In order to record signals on the optical information recording medium of the present invention, for example, a recording device shown in FIG. 3 can be used. A phase change optical disk 21 in a phase difference reproduction structure is secured onto a spindle motor 22 and rotated while controlling the rotation. A modulated laser beam is radiated from laser beam source 24 in response to a signal from a signal generation circuit 23. The laser beam is refracted at a mirror 26 provided in a feeding mechanism 25 and focused on a recording thin film by an objective lens 27 so that information is recorded. In this case, the movement rate of the feeding mechanism 25 is controlled so that the interval between recorded signal tracks is constant. For example, when signals are recorded in the same density as that of a read-only DVD, the feeding rate in the radial direction is controlled so that the interval between signal tracks is about 0.74 μm. In this case, the laser beam source 24 used for recording may be a gas laser such as an Ar laser or a semiconductor laser. A focus servo mechanism 28 may be performed with a He—Ne laser.

The optical disk with signals recorded in this manner is irradiated with a laser beam for reproduction so that phase difference tracking error signals can be obtained. The tracking error signals are used for the tracking servo mechanism so that phase difference reproduction signals can be detected.

Furthermore, for recording signals in high density, in view of widening the power tolerance for recording, it is more desirable to have the wavelength of the laser beam for recording be shorter than the wavelength of laser beam for reproduction rather than vice versa. Therefore, a preferable relationship of $\lambda_1$ and $\lambda_2$ is $\lambda_1 \leq \lambda_2$.

Next, the results of the examination for a preferable material for a recording thin film to obtain a phase difference reproduction structure in a phase change disk will be described below.

A general material for a recording thin film of a recordable and erasable phase change optical disk is a ternary composition of Ge—Sb—Te. Among the ternary composition based-materials, compositions having a relatively high crystallization rate are in a range centering on the line connecting the two compositions GeTe and $Sb_2Te_3$. The compositions within this range have been in practical use for the recording thin films of phase change optical disks.

Figure 4:
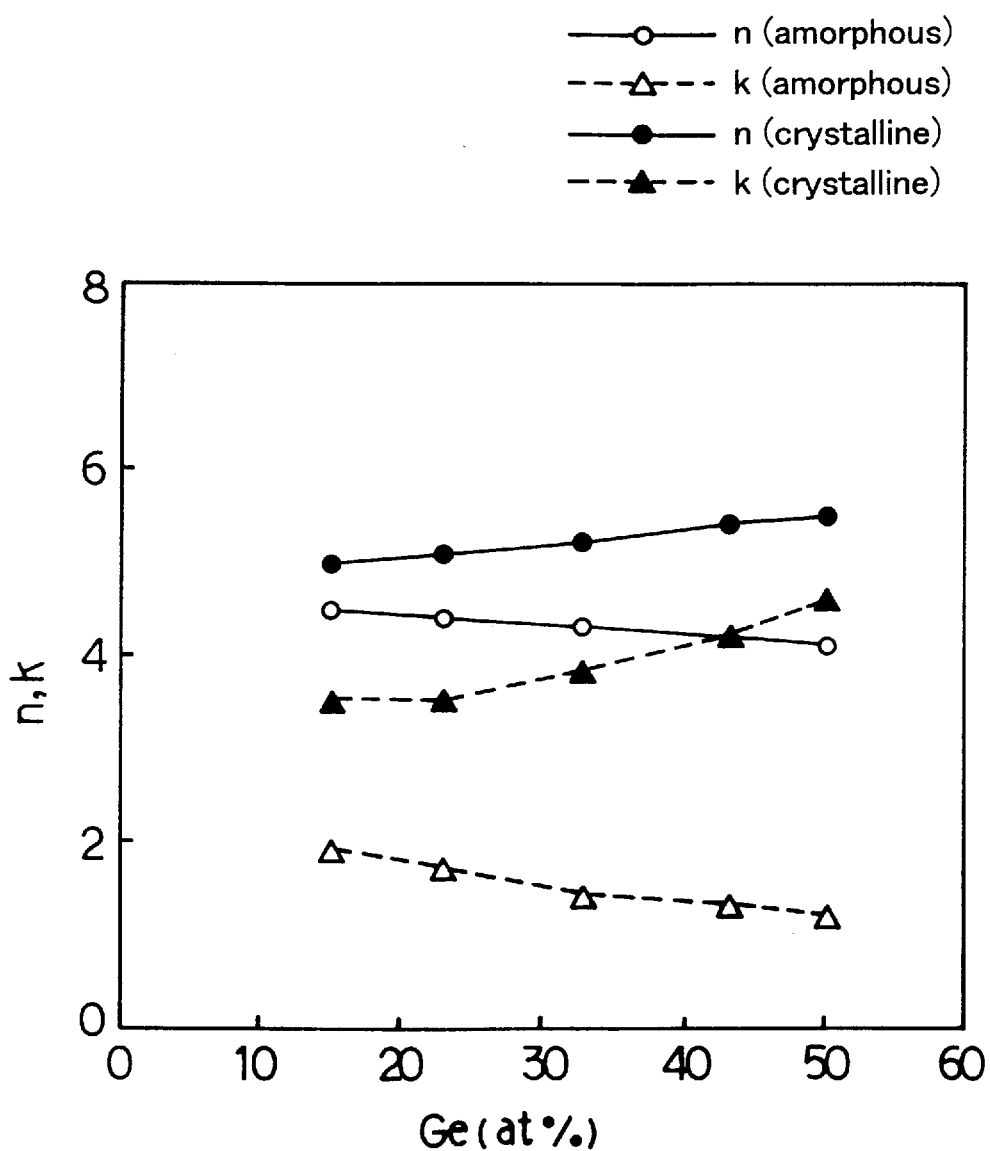
FIG. 4 is a graph showing optical constants of compositions on the line connecting two compositions of GeTe and $Sb_2Te_3$ with respect to a wavelength of 650 nm.

FIG. 4 shows the results of the investigation of the optical constants at a wavelength of 650 nm in the amorphous state and the crystalline state with respect to the compositions on the line connecting two compositions GeTe and $Sb_2Te_3$. In the vertical axis of FIG. 4, n represents a refractive index, and k represents an extinction coefficient. As seen from FIG. 4, the change in the optical constant is larger as the composition is closer to GeTe. In an attempt to obtain a phase difference reproduction structure in a phase change optical disk, a larger change in the optical constant between the amorphous state and the crystalline state results in a higher reflectance in the structure.

The structures are formed with a substrate composed of polycarbonate, a 10 nm recording thin film, protective layers both at the substrate side and the reflective layer side composed of a transparent dielectric (supposedly ZnS-20 mol % of $SiO_2$) having a refractive index of 2.1, and a 50 nm reflective layer composed of Au. In this case, among the structures that have a phase difference π between the light reflected from the amorphous portions and the light reflected from the crystalline portions with respect to incident light at a wavelength of 650 nm, the structures having a reflectance of the former equal to that of the latter and the largest reflectance were determined by optical calculation. Table 1 shows the results.

TABLE 1

| Ge content (at %) | 15 | 20 | 25 | 30 | 35 | 40 | 45 | 50 |
|---|---|---|---|---|---|---|---|---|
| Reflectance (%) | 3 | 4 | 5 | 6 | 7 | 9 | 10 | 11 |

As seen from Table 1, the recording thin film whose composition is closer to GeTe has a higher reflectance. This tendency is presented with recording thin films having different thicknesses. However, when the thickness of the recording thin film is less than 5 nm or more than 20 nm, the reflectance of the recording thin film having a phase difference π is excessively low or substantially nil, so that it is difficult to put the medium to practical use.

Figure 5:
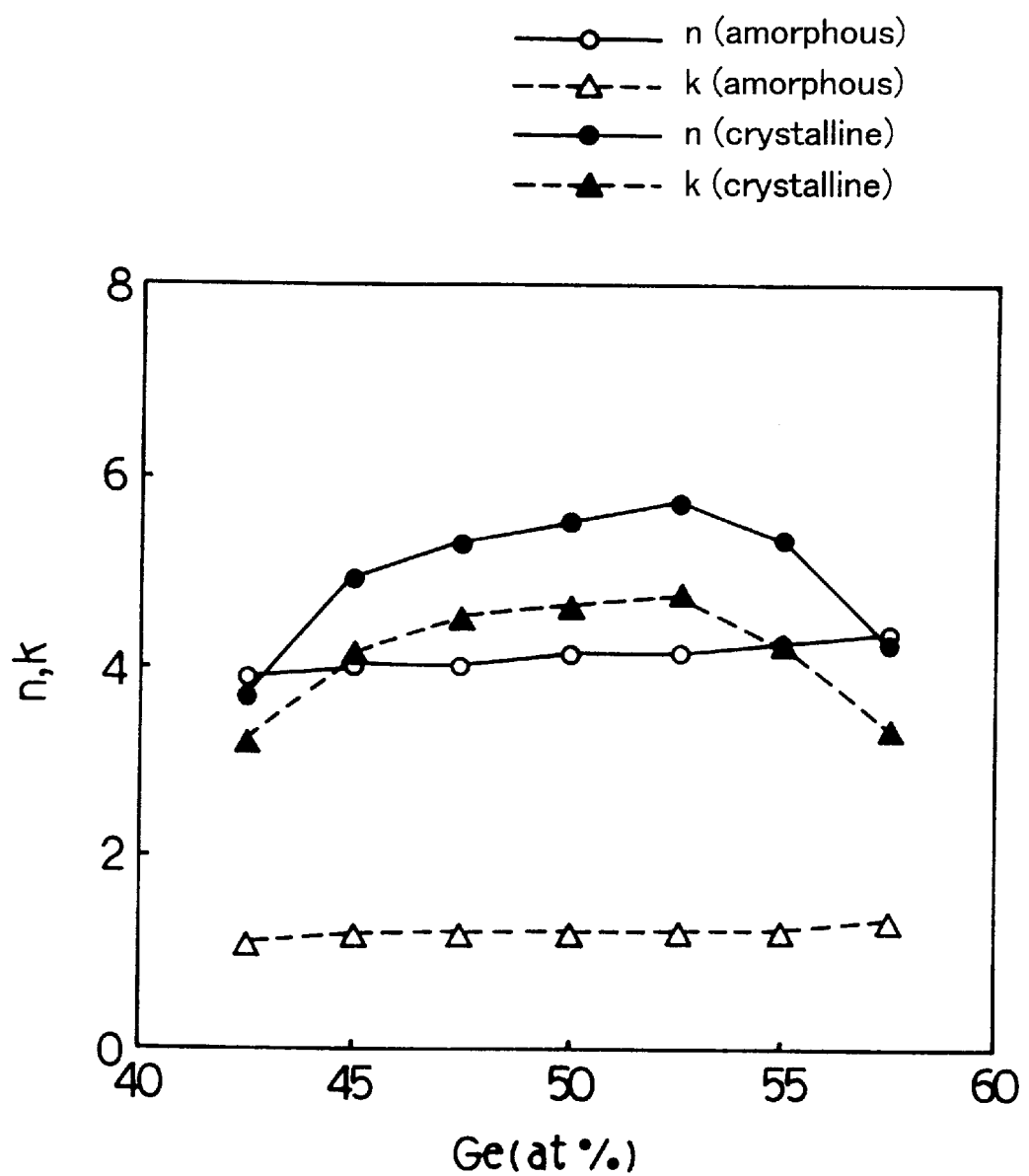
FIG. 5 is a graph showing optical constants of Ge—Te binary material compositions in the vicinity of GeTe with respect to a wavelength of 650 nm.

In the case of the optical disk of this embodiment, the higher reflectance is the more preferable. This is because the reflectance becomes closer to the reflectance of a read-only optical disk. Then, the compositions in the vicinity of GeTe in a binary composition of Ge—Te were examined. FIG. 5 shows the results. In the vertical axis of FIG. 5, n represents a refractive index, and k represents an extinction coefficient. As seen from FIG. 5, the change in the optical constant is the largest in the composition in the vicinity of $Ge_{53}Te_{47}$ (the composition ratio is expressed by the ratio in atomic weight).

The structures were formed with a substrate composed of polycarbonate, a 10 nm recording thin film, protective layers both at the substrate side and the reflective layer side composed of a transparent dielectric (supposedly ZnS-20 mol % of $SiO_2$) having a refractive index of 2.1, and a 50 nm reflective layer composed of Au. In this case, among the structures that have a phase difference π between the light reflected from the amorphous portions and the light reflected from the crystalline portions with respect to incident light at a wavelength of 650 nm, the structures having a reflectance of the former equal to that of the latter and the largest reflectance were determined by optical calculations. Table 2 shows the results.

TABLE 2

| Ge content (at %) | 42.5 | 45.0 | 47.5 | 50.0 | 52.5 | 55.0 | 57.5 |
|---|---|---|---|---|---|---|---|
| Reflectance (%) | 6 | 9 | 10 | 11 | 12 | 10 | 7 |

As seen from Table 2, the recording thin film whose composition is in the vicinity of $Ge_{53}Te_{47}$ (the composition ratio is expressed by the ratio in atomic weight) has the highest reflectance. Furthermore, when the Ge content is from 45 at % to 55 at %, the obtained phase difference reproduction structure can perform well at the wavelength of 650 nm for reproduction light. This tendency is presented with recording thin films having different thicknesses. However, when the thickness of the recording thin film is less than 5 nm or more than 20 nm, the reflectance of the recording thin film having a phase difference of π is excessively low or substantially nil, so that it is difficult to put the medium to practical use.

As described above, it is preferable that the main elements constituting the recording thin film are Ge and Te, and that the ratio in the atomic weight of Ge to Te is in the range from 45:55 to 55:45. Herein, "main element" refers to an element that has a relatively high ratio in the atomic weight among the elements constituting the recording thin film. The phrase "the main elements are Ge and Te" means that the elements that have the highest and the second highest ratio in the atomic weight among the elements constituting the recording thin film are Ge and Te.

Thus, optically, when a recording thin film is composed of a Ge—Te material containing Ge in the range from 45 at % to 55 at %, more preferably, a composition in the vicinity of $Ge_{53}Te_{47}$, a phase difference reproduction medium having a higher reflectance can be obtained.

However, when selecting a recording thin film material, in addition to the optical characteristics, it is important to make sure that the material has a crystallization rate corresponding to the recording linear velocity. According to the results of this examination, when the recording linear velocity was in the range from 2.6 m/s to 8 m/s, and the Ge content was 52 at % to 55 at % or 45 at % to 48 at %, satisfactory record marks were formed.

Furthermore, other elements were added to a Ge—Te binary alloy in order to improve the reproduction optical degradation characteristics by raising the temperature for crystallization of the recording thin film. As a result, the characteristics were improved by adding at least one selected from the group consisting of rare gas elements, B, C, Al, Si, Ti, V, Cr, Mn, Fe, Co, Ni, Zr, Ni, Se, Nb, Sb, Ta, W, Au, Pb and Bi in an appropriate amount.

However, when the atomic weight of an element other than Ge and Te among the above-listed elements was more than 10% of the sum of the atomic weights of Ge and Te, the change in the, optical characteristics became small. Thus, a large reflectance was not obtained in some cases. Therefore, these elements are added preferably in an amount not more than 10% of the sum of the atomic weights of Ge and Te.

The composition of the recording thin film described above can be applied as the recording thin film of the optical information recording medium according to the first embodiment of the present invention.

The second embodiment that has been described so far assumes that the record marks correspond to the amorphous regions in the recording thin film, and the non-recorded portions (non-record marks) correspond to crystalline regions. However, the record marks may be crystalline regions in the recording thin film, and the non-recorded portions (non-record marks) can be amorphous regions. In this case, it is not necessary to initialize the optical disk (crystallize the entire recording region).

Furthermore, a recording device and a reproducing device preferably are integrated to form one apparatus, especially in such a manner that a mechanism for rotating a disk is used for recording and reproduction. However, the recording device and the reproducing device may be used separately. For example, it is practical to use a commercially available DVD reproducing apparatus or a slightly modified commercially available DVD reproducing apparatus (for example, the reproduction gain is raised, or the intensity of reproduction light is raised so that the reproducing apparatus can be used with an optical information medium having a low reflectance) as the reproducing device. One application of the present invention can be as an authoring tool of a DVD. However, the present invention is not limited to the read-only DVD. The present invention provides a recording and reproducing method and an optical information recording medium useful in a higher density recording format.

Hereinafter, the present invention will be described more specifically by way of specific examples.

EXAMPLE 1

ZnS—$SiO_2$, $Ge_{53}Te_{47}$, ZnS—$SiO_2$, and Au films were sequentially formed in thicknesses of 70 to 140 nm, 10 nm, 39 nm, and 50 nm, respectively, on a substrate composed of polycarbonate having a diameter of 120 mm and a thickness of 0.6 mm by magnetron sputtering. The surface of the substrate was covered with guide grooves forming concavities and convexities having a pitch of 0.74 μm and a groove depth of 26 nm. A polycarbonate substrate with the same shape was attached to the obtained optical disk with an ultraviolet curing resin to act as a back cover (protective substrate). The refractive index of the polycarbonate substrate was 1.59 at a wavelength of 650 nm. The optical characteristics of this optical disk with respect to a wavelength of 650 nm were measured (the optical characteristics were measured by using a specular substrate that includes no guide grooves in order to avoid the influence of diffraction at the grooves). When the thickness of the $ZnS$—$SiO_2$ layer on the side of the substrate was 104 nm, the reflectance of the recording thin film in the amorphous state and the reflectance of the recording thin film in the crystalline state were both 10%. The reflectance in the crystalline state becomes higher, whereas the reflectance in the amorphous state becomes lower, as the thickness of the $ZnS$—$SiO_2$ layer on the side of the substrate is smaller than 104 nm. In this case, the phase difference between the reflected light in the crystalline state and the reflected light in the amorphous state is $0.9\pi$, which is common to all the disks. This is because the phase difference primarily depends on the thickness of the $ZnS$—$SiO_2$ layer on the side of the reflective layer. The phase difference between the reflected light in the crystalline state and the reflected light in the amorphous state was measured with an interference microscope. These optical disks were initialized. The crystalline state of the recording layer corresponded to the non-recorded state, and the amorphous state of the recording layer corresponded to the record marks.

Figure 6:
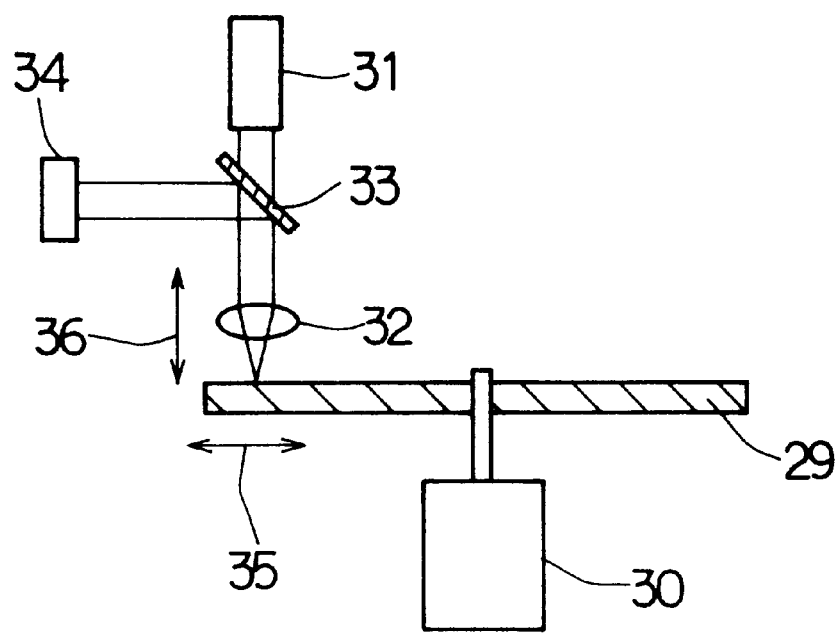
FIG. 6 is a schematic drawing showing a structural example of a recording/reproducing device used for recording and reproducing signals on the optical information recording medium of the present invention.

Signals were recorded on these optical disks and the recorded signals were reproduced with a recording and reproducing device as shown in FIG. 6. An optical disk 29 was secured onto a spindle motor 30 and rotated therewith while controlling the rotation. Signals were recorded by focusing a laser beam radiated from a laser beam source 31 on the recording thin film by an objective lens 32. The signals were reproduced by detecting the laser beam radiated from the laser beam source 31 through the objective lens 32 and a half mirror 33 by a photodetector 34. In FIG. 6, reference numeral 35 denotes a tracking servo mechanism, and reference numeral 36 denotes a focus servo mechanism.

The laser beam source 31 used for the recording and the reproduction is a semiconductor laser with wavelength of 650 nm. The NA (numerical aperture) of the objective lens 32 is 0.6. In the process of the recording, a push-pull method was used for tracking, and the signals were recorded between the guide grooves.

Figure 7:
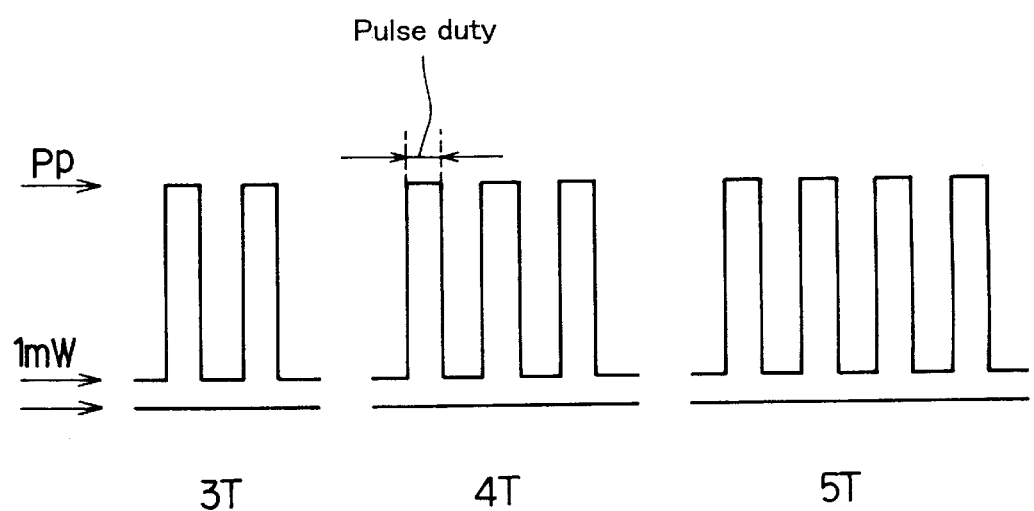
FIG. 7 is a view showing an example of modulated waveforms of a recording pulse for recording signals on the optical information recording medium in the examples of the present invention.

FIG. 7 shows modulated waveforms of a recording pulse. Information for recording was recorded with pulses modulated in a 8/16, RLL (2,10) modulation system. At this time, the recording linear velocity was 3.5 m/s, and the linear density of recorded signals was 0.267 μm/bit. When the recording pulse duty was 30%, signals were able to be recorded with a peak power of 7.1 mW. For reproducing the recorded signals, phase difference tracking error signals were detected and used for the tracking servo mechanism. The power of the reproduction light was 0.8 mW.

Table 3 shows reproduction jitter s for each disk when the drive is switched between two states. In a first drive state, circuit noise of reproduction system is reduced as much as possible. In a second drive state, noise is intentionally caused in the circuit of the reproduction system.

TABLE 3

| Reflectance Ratio $I_2/I_1$ | State 1 (circuit noise:low) | | State 2 (circuit noise:high) | |
|---|---|---|---|---|
| | Reproduction jitter | Reproduction waveform envelope | Reproduction jitter | Reproduction waveform envelope |
| 4.0 | >25% | good | >25% | good |
| 3.0 | 14% | good | 16% | good |
| 2.0 | 12% | good | 13% | good |
| 1.3 | 10% | good | 14% | good |
| 1.0 | 9% | good | 20% | disturbed |

A high reflectance ratio of a disk in Table 3 means that the disk has a high initial reflectance ratio and a high average reproduction reflectance after recording. When the reflectance ratio is high, satisfactory reproduction jitters can be obtained, partly because a stable focus servo operation can be obtained even in a high noise reproduction system. However, when the reflectance ratio is excessively high (more than 3), the signal quality for phase difference reproduction is degraded before considering the stability of reproduction, so that reproduction jitters are degraded.

When signals were recorded on the guide grooves, the reproduction jitters were larger under any recording conditions than those obtained when signals were recorded between the guide grooves.

In this example, the crystalline state of the recording thin film was used as an initial state (non-recorded state). However, when a crystallization treatment was not performed and the amorphous state was used as the non-recorded state, and recording was performed by crystallization, the same results as those of Table 3 were obtained.

EXAMPLE 2

$ZnS$—$SiO_2$, $Ge_{53}Te_{47}$, $ZnS$—$SiO_2$, and Au films were sequentially formed in thicknesses of 70 to 140 nm, 10 nm, 48 nm, and 50 nm, respectively, on a substrate composed of polycarbonate having a diameter of 120 mm and a thickness of 0.6 mm by magnetron sputtering. The surface of the substrate was covered with guide grooves forming concavities and convexities having a pitch of 0.74 μm and a groove depth of 26 nm. A polycarbonate substrate with the same shape was attached to the obtained optical disk with an ultraviolet curing resin to act as a back cover (protective substrate). The refractive index of the polycarbonate substrate was 1.59 at a wavelength of 650 nm. The optical characteristics of this optical disk with respect to a wavelength of 650 nm were measured (the optical characteristics were measured by using a specular substrate that includes no guide grooves in order to avoid the influence of diffraction at the grooves). When the thickness of the $ZnS$—$SiO_2$ layer on the side of the substrate was 104 nm, the reflectance of the recording thin film in the amorphous state and the reflectance of the recording thin film in the crystalline state were both 10%. The reflectance in the crystalline state becomes higher, whereas the reflectance in the amorphous state becomes lower, as the thickness of the $ZnS$—$SiO_2$, layer on the side of the substrate is smaller than 104 nm. In this case, the phase difference between the reflected light in the crystalline state and the reflected light in the amorphous state is $1.1\pi$ ($(2-0.9)\times\pi$ in another expression), which is common to all the disks. This is because the phase difference primarily depends on the thickness of the $ZnS$—$SiO_2$ layer on the side of the reflective layer. The phase difference between the reflected light in the crystalline state and the reflected light in the amorphous state was measured with an interference microscope. These optical disks were initialized. The crystalline state of the recording layer corresponded to the non-recorded state, and the amorphous state of the recording layer corresponded to the record marks.

Signals were recorded on these optical disks and the recorded signals were reproduced with a recording and reproducing device as shown in FIG. 6. The laser beam source used for recording and reproduction is a semiconductor laser with wavelength of 650 nm. The NA (numerical aperture) of the objective lens is 0.6. In the process of the recording, a push-pull method was used for tracking, and the signals were recorded on the guide grooves.

FIG. 7 shows modulated waveforms of a recording pulse. Information for recording was recorded with pulses modulated in a 8/16, RLL (2,10) modulation system. At this time, the recording linear velocity was 3.5 m/s, and the linear density of recorded signals was 0.267 $\mu$m/bit. When the recording pulse duty was 30%, signals were able to be recorded with a peak power of 7.1 mW. For reproducing the recorded signals, phase difference tracking error signals were detected and used for the tracking servo mechanism. The power of the reproduction light was 0.8 mW.

Table 4 shows reproduction jitters for each disk when the drive is switched between two states. In a first drive state, circuit noise of the reproduction system is reduced as much as possible. In a second drive state, noise is intentionally caused in the circuit of the reproduction system.

TABLE 4

| Reflectance Ratio $I_2/I_1$ | State 1 (circuit noise:low) | | State 2 (circuit noise:high) | |
|---|---|---|---|---|
| | Reproduction jitter | Reproduction waveform envelope | Reproduction jitter | Reproduction waveform envelope |
| 4.0 | >25% | good | >25% | good |
| 3.0 | 15% | good | 16% | good |
| 2.0 | 12% | good | 13% | good |
| 1.3 | 10% | good | 13% | good |
| 1.0 | 9% | good | 22% | disturbed |

A high reflectance ratio of a disk in Table 4 means that the disk has a high initial reflectance ratio and a high average reproduction reflectance after recording. When the reflectance ratio is high, satisfactory reproduction jitters can be obtained, partly because a stable focus servo operation can be obtained even in a high noise reproduction system. However, when the reflectance ratio is excessively high (more than 3), the signal quality for phase difference reproduction is degraded before considering the stability of reproduction, so that reproduction jitters are degraded.

When signals were recorded between the guide grooves, the reproduction jitters were larger under any recording conditions than those obtained when signals were recorded on the guide grooves.

In this example, the crystalline state of the recording thin film was used as an initial state (non-recorded state). However, when a crystallization treatment was not performed and the amorphous state was used as the non-recorded state, and recording was performed by crystallization, the same results as those of Table 4 were obtained.

EXAMPLE 3

ZnS—SiO$_2$, Ge$_{53}$Te$_{47}$, ZnS—SiO$_2$, and Au films were sequentially formed in thicknesses of 70 to 140 nm, 10 nm, 44 nm, and 50 nm, respectively, on a substrate composed of polycarbonate having a diameter of 120 mm and a thickness of 0.6 mm by magnetron sputtering. The surface of the substrate for the recording region was specular. A polycarbonate substrate with the same shape was attached to the obtained!optical disk with an ultraviolet curing resin to act as a back cover (protective substrate). The optical characteristics of this optical disk with respect to a wavelength of 650 nm were measured. When the thickness of the ZrS—SiO$_2$ layer on the side of the substrate was 104 nm, the reflectance of the recording thin film in the amorphous state and the reflectance of the recording thin film in the crystalline state were both 10%. The reflectance in the crystalline state becomes higher, whereas the reflectance in the amorphous state becomes lower, as the thickness of the ZnS—SiO$_2$ layer on the side of the substrate is smaller than 104 nm. In this case, the phase difference between the reflected light in the crystalline state and the reflected light in the amorphous state is 1.0$\pi$, which is common to all the disks. This is because the phase difference primarily depends on the thickness of the ZnS—SiO$_2$ layer on the side of the reflective layer. The phase difference between the reflected light in the crystalline state and the reflected light in the amorphous state was measured with an interference microscope. These optical disks were initialized. The crystalline state of the recording layer corresponded to the non-recorded state, and the amorphous state of the recording layer corresponded to the record marks.

Signals were recorded on these optical disks with a recording device as shown in FIG. 3. The laser beam source used for recording is a semiconductor laser with wavelength of 65 nm. The NA (numerical aperture) of the objective lens is 0.6. In the process of recording, the feeding rate in the radial direction of the objective lens was controlled so that the interval between signal tracks was about 0.74 $\mu$m constantly. FIG. 7 shows modulated waveforms of the recording pulse. Information for recording was recorded with pulses modulated in a 8/16, RLL (2,10) modulation system. At this time, the recording linear velocity was. 3.5 m/s, the linear density of recorded signals was 0.267 $\mu$m/bit. When the recording pulse duty was 30%, signals were able to be recorded with a peak power of 6.9 mW.

For reproducing the recorded signals, a recording and reproducing device as shown in FIG. 6 was used. The laser beam source is a semiconductor laser with wavelength of 650 nm. The NA (numerical aperture) of the objective lens is 0.6. Phase difference tracking error signals were detected and used for the tracking servo mechanism. The power of the reproduction light was 0.8 mW. Then, the reproduction characteristics of the disks were compared in the reproduction drive where the circuit noise was reduced as much as possible and in the reproduction drive where the noise was raised intentionally. The results were as follows. When the reflectance ratio $I_2/I_1$ was 1.3 or more with respect to the wavelength (650 nm) of the reproduction light, the stability during reproduction, especially the stability of the focus servo mechanism, was raised and satisfactory reproduction jitters were obtained. On the other hand, in the disks having a reflectance ratio $I_2/I_1$ of more than 3, although the focus servo mechanism was stabilized, the quality of phase difference reproduction signals, which is more important, was degraded.

EXAMPLE 4

Signals were recorded on the same optical disk as in Example 3 with a recording device as shown in FIG. 3. The laser beam source used for recording is an Ar laser with wavelength of 458 nm. The NA (numerical aperture) of the objective lens is 0.55. In the process of recording, the feeding rate in the radial direction of the objective lens was controlled so that the interval between signal tracks was about 0.74 μm constantly. FIG. 7 shows modulated waveforms of the recording pulse. Information for recording was recorded with pulses modulated in a 8/16, RLL (2,10) modulation system. At this time, the recording linear velocity was 3.5m/s, the linear density of recorded signals was 0.267 μm/bit. When the recording pulse duty was 30%, signals were able to be recorded with a peak power of 7.3 mW.

For reproducing the recorded signals, a recording and reproducing device as shown in FIG. 6 was used. The laser beam source is a semiconductor laser with wavelength of 650 nm. The NA (numerical aperture) of the objective lens is 0.6. Phase difference tracking error signals were detected and used for the tracking servo mechanism. The power of the reproduction light was 0.8 mW.

The jitter of the reproduction signals was 1 to 2% better than that of the same disk in Example 3. As in Example 3, when the reflectance ratio $I_2/I_1$ was 1.3 or more at 650 nm of the reproduction light, the stability during reproduction, especially the stability of the focus servo mechanism, was raised and satisfactory reproduction jitters were obtained. On the other hand, in the disks having a reflectance ratio $I_2/I_1$ of more than 3, although the focus servo mechanism was stabilized, the quality of phase difference reproduction signals, which is more important, was degraded.

The embodiments and the examples disclosed in this application are intended to describe the technical idea of the present invention and are to be considered as illustrative and not limiting the present invention. The present invention may be embodied in other forms without departing from the spirit or essential characteristics thereof and the scope of the invention, and all changes which come within the meaning and range of equivalency of the claims are intended to be embraced therein.

INDUSTRIAL APPLICABILITY

The present invention can be utilized in a variety of recordable optical disks such as a phase change optical disk, a magneto-optical disk and a dye disk, and an apparatus for recording and reproducing information on these optical disks.

What is claimed is:

1. A method for recording and reproducing information on an optical information recording medium, comprising the steps of:
    irradiating an optical information recording medium with a laser beam based on an information signal, the optical information recording medium comprising at least a recording thin film that effects a phase change between an amorphous state and a crystalline state by the irradiation of the laser beam, the recording thin film formed on a disk-shaped substrate including guide grooves; thereby recording a desired signal by forming a record mark on the recording thin film while applying a tracking servo mechanism with a tracking error signal obtained from the guide grooves of the substrate; and
    irradiating the optical information recording medium where the record mark is formed on the recording thin film with laser beam; thereby reproducing a signal while applying a tracking servo mechanism based on a tracking error signal obtained from the record mark;
    wherein a groove depth d (nm) of the guide groove, a wavelength $\lambda_1$ (nm) of the laser beam for recording and a refractive index $n_1$ of the substrate at the wavelength $\lambda_1$ satisfy a relationship:

$$0.05 \times \lambda_1/n_1 \leq d;$$

a groove depth d (nm) of the guide groove, a wavelength $\lambda_2$ (nm) of the laser beam for reproducing the record mark formed on the recording thin film and a refractive index $n_2$ of the substrate at the wavelength $\lambda_2$ satisfy a relationship:

$$d \leq 0.09 \times \lambda_2/n_2;$$

and
        the wavelength $\lambda_2$ and the wavelength $\lambda_1$ satisfy a relationship:

$$\lambda_1 \leq \lambda_2.$$

2. The method for recording and reproducing information on an optical information recording medium according to claim 1, wherein a tracking system for recording a signal on the recording thin film is a push-pull method.

3. The method for recording and reproducing information on an optical information recording medium according to claim 1, wherein a tracking system for reproducing a signal recorded on the recording thin film is a phase difference tracking method.

4. The method for recording and reproducing information on an optical information recording medium according to claim 1, wherein
    when a phase $\phi_1$ of light reflected from the record mark on the optical information recording medium and a phase $\phi_2$ of light reflected from a non-record mark region between the record marks with respect to a wavelength $\lambda_2$ of incident laser beam for reproduction satisfy a relationship:

$$(2n+0.5) \times \pi < \phi_2 - \phi_1 < (2n+1) \times \pi,$$

where n is an integer, a signal is recorded between the grooves of the substrate; and
    when the following relationship is satisfied:

$$(2n+1) \times \pi < \phi_2 - \phi_1 < (2n+1.5) \times \pi,$$

where n is an integer, a signal is recorded on the grooves of the substrate.

5. The method for recording and reproducing information on an optical information recording medium according to claim 1, wherein
    a value of a wavelength $\lambda_2$ of the laser beam for reproducing the record mark is 630 nm to 670 nm,
    an interval between the guide grooves is 0.74 μm,
    a linear density of recorded signals is 0.267 μm/bit, and
    a modulation system of the signal is 8/16, RLL (2,10).

6. The method for recording and reproducing information on an optical information recording medium according to claim 1, wherein
    in the step of forming the record mark based on an information signal on the recording thin film, at least the recording thin film on which the record mark is to be formed is crystallized beforehand, and thereafter, the recording thin film is irradiated with laser beam to form the record mark that is amorphous.

7. A method for recording and reproducing information on an optical information recording medium comprising the steps of:

irradiating an optical information recording medium with a laser beam based on an information signal while rotating a substrate and moving a laser beam irradiation portion so that an interval between recorded signals in a radial direction is constant, the optical information recording medium comprising at least a recording thin film that effects a phase change between an amorphous state and a crystalline state by the irradiation of the laser beam, the recording thin film formed on a disk-shaped substrate including a specular recording region; thereby effecting the phase change to form a record mark on the recording thin film to record desired signals at a constant interval in the radial direction; and irradiating the optical information recording medium where the record mark is formed on the recording thin film with laser beam; thereby reproducing a signal while applying a tracking servo mechanism based on a tracking error signal obtained from the record marks; wherein a value of a wavelength of the laser beam for reproducing a signal recorded on the recording thin film is 630 nm to 670 nm, an interval between the recorded signal tracks in the radial direction is 0.74 $\mu$m, a linear density of recorded signals is 0.267 $\mu$m/bit, and a modulation system of the signal is 8/16, RLL (2,10).

8. The method for recording and reproducing information on an optical information recording medium according to claim 7, wherein a tracking system for reproducing a signal recorded on the recording thin film is a phase difference tracking method.

9. The method for recording and reproducing information on an optical information recording medium according to claim 7, wherein in the step of forming the record mark based on an information signal on the recording thin film, at least the recording thin film on which the record mark is to be formed is crystallized beforehand, and thereafter, the recording thin film is irradiated with laser beam to form the record mark that is amorphous.

10. A method for recording and reproducing information on an optical information recording medium, comprising the steps of:

irradiating an optical information recording medium with a laser beam based on an information signal, the optical information recording medium comprising at least a recording thin film that effects a phase change between an amorphous state and a crystalline state by the irradiation of the laser beam, the recording thin film formed on a disk-shaped substrate including guide grooves; thereby recording a desired signal by forming a record mark on the recording thin film while applying a tracking servo mechanism with a tracking error signal obtained from the guide grooves of the substrate; and irradiating the optical information recording medium where the record mark is formed on the recording thin film with laser beam; thereby reproducing a signal while applying a tracking servo mechanism based on a tracking error signal obtained from the record mark;

wherein when a phase $\phi_1$ of light reflected from the record mark on the optical information recording medium and a phase $\phi_2$ of light reflected from a non-record mark region between the record marks with respect to a wavelength $\lambda_2$ of incident laser beam for reproduction satisfy a relationship:

$$(2n+0.5)\times\pi<\phi_2-\phi_1<(2n+1)\times\pi,$$

where n is an integer, a signal is recorded between the grooves of the substrate; and when the following relationship is satisfied:

$$(2n+1)\times\pi<\phi_2-\phi_1<(2n+1.5)\times\pi,$$

where n is an integer, a signal is recorded on the grooves of the substrate.

11. The method of claim 10, wherein a value of a wavelength $\lambda_2$ of the laser beam for reproducing the record mark is 630 nm to 670 nm, an interval between the guide grooves is 0.74 $\mu$m, a linear density of recorded signals is 0.267 $\mu$m/bit, and a modulation system of the signal is 8/16, RLL (2,10).

12. The method of claim 10, wherein in the step of forming the record mark based on an information signal on the recording thin film, at least the recording thin film on which the record mark is to be formed is crystallized beforehand, and thereafter, the recording thin film is irradiated with laser beam to form the record mark that is amorphous.

* * * * *